(12) United States Patent
Bollinger

(10) Patent No.: US 10,676,137 B2
(45) Date of Patent: Jun. 9, 2020

(54) AUTOMOTIVE VEHICLE BODY

(71) Applicant: Bollinger Motors LLC, Hobart, NY (US)

(72) Inventor: Robert Bollinger, Detroit, MI (US)

(73) Assignee: Bollinger Motors, LLC, Ferndale, MI (US)

( * ) Notice: Subject to any disclaimer, the term of this patent is extended or adjusted under 35 U.S.C. 154(b) by 179 days.

(21) Appl. No.: 15/984,863

(22) Filed: May 21, 2018

(65) Prior Publication Data

US 2019/0351950 A1    Nov. 21, 2019

(51) Int. Cl.
| | |
|---|---|
| *B62D 25/20* | (2006.01) |
| *B60K 1/04* | (2019.01) |
| *B60R 5/00* | (2006.01) |
| *B60R 5/04* | (2006.01) |
| *B62D 33/03* | (2006.01) |

(52) U.S. Cl.
CPC ............... *B62D 25/20* (2013.01); *B60K 1/04* (2013.01); *B60R 5/006* (2013.01); *B60R 5/041* (2013.01); *B62D 33/03* (2013.01); *B60K 2001/0438* (2013.01)

(58) Field of Classification Search
CPC .......... B62D 25/20; B62D 33/03; B60K 1/04; B60K 2001/0438; B60R 5/041; B60R 5/006

USPC ........................................................ 296/57.1
See application file for complete search history.

(56) References Cited

U.S. PATENT DOCUMENTS

| | | | | |
|---|---|---|---|---|
| 5,738,405 A | * | 4/1998 | Richters ................... | B60J 1/085 296/146.15 |
| 7,240,960 B2 | * | 7/2007 | Fallis, III ............... | B60J 7/0053 296/107.19 |
| 2008/0100085 A1 | * | 5/2008 | Ohly .................. | B62D 33/0273 296/57.1 |

* cited by examiner

*Primary Examiner* — Joseph D. Pape
*Assistant Examiner* — Dana D Ivey
(74) *Attorney, Agent, or Firm* — Varnum, Riddering, Schmidt & Howlett LLP

(57) ABSTRACT

An automotive vehicle includes a body having floorboards positioned along the base of the vehicle body and extending from a front end of the vehicle to a rear end of the vehicle along an uninterrupted path. The path may be accessed by a front opening in the body or a rear opening in the body. A pass through door may provide selective access to a front trunk along the uninterrupted path through the vehicle dash board. In an embodiment the vehicle may include a reconfigurable rear cab comprising a plurality of removably connected components configurable between at least a first and second arrangement.

20 Claims, 11 Drawing Sheets

AUTOMOTIVE VEHICLE BODY

FIELD OF INVENTION

The present invention relates to the field of automotive vehicles and specifically to an automotive vehicle body design.

BACKGROUND

Automotive vehicles with traditional combustion engines typically are designed with the engine positioned inside the front hood of the vehicle. This positioning is due to weight distribution, space utilization, as well as other reasons design constraints and optimization. In some vehicles, combustion engines are positioned in the rear or trunk to allow for front access or storage. However, in all such designs, the rear or front of the vehicle is occupied with the combustion engine.

Alternative energy powered vehicles, such as electric vehicles, hydrogen powered vehicles, or the like, allow for different configuration options for the vehicle body and cabin. Specifically, the entire powertrain of the vehicle, such as batteries, hydrogen cells, or similar, may be contained in or below the base of the vehicle, thus freeing both the front and rear of the vehicle for storage and other uses. However, current vehicle designs fail to provide full and optimal utilization of the vehicle space by allowing for both the rear and front space to be selectively accessed simultaneously while also providing appropriate safety and containment features to secure cargo in desired areas.

Accordingly, an improved automotive vehicle body is needed in the industry.

SUMMARY

An automotive vehicle is generally presented. The automotive vehicle includes a plurality of wheels connected to a chassis and a vehicle body connected to the chassis. The body includes a front end and a rear end. One or more floorboards may be positioned along the base of the vehicle body and extend from the front end of the vehicle to the rear end of the vehicle. The vehicle body may include a rear access opening at the rear end of the vehicle and a front access opening in the front end of the vehicle, where both the rear and front access openings are positioned at the floorboards. An uninterrupted path may be formed between the rear access opening and front access opening along the floorboards.

In an embodiment the vehicle includes a front gate connected to the front access opening, such as hinged to the body at the front access opening. The vehicle may also include a tailgate connected to the rear access opening, such as hinged to the body at the rear access opening.

In an embodiment, an automotive vehicle includes a plurality of wheels connected to a chassis and a vehicle body connected to the chassis. The body includes a front end and a rear end and a cab having an interior. One or more floorboards may be positioned along the base of the vehicle body and extend from the front end of the vehicle through the interior of the cab. A dashboard may be positioned within the cab interior, the dashboard including a pass through door located therein. The pass through door may be configured to move between an open position and a closed position. An uninterrupted path may be formed along the floorboards between the interior of the cab and the front end of the vehicle, wherein the pass through door is positioned within the uninterrupted path.

In an embodiment, the pass through door may be hinged and configured to pivot between an open and closed position, and may be storable within the dashboard.

In an embodiment, an automotive vehicle may include a plurality of wheels connected to a chassis and a vehicle body connected to the chassis. The body may include a front end, a rear end, and a cab having an interior. The vehicle may include a plurality of detachable components forming a portion of the cab. The components may include a rear window panel removably connected to the rear end of the body. First and second side window panels may each be removably connected to the rear window panel and removably connected to a portion of the body. First and second top rails may each be removably connected between a top portion of the rear window panel and a side pillar. And one or more roof panels may each be removably connected to the first and second top rails to form the a portion of the roof of the cab.

BRIEF DESCRIPTION OF THE DRAWINGS

The operation of the invention may be better understood by reference to the detailed description taken in connection with the following illustrations, wherein.

DETAILED DESCRIPTION

Figure 1:
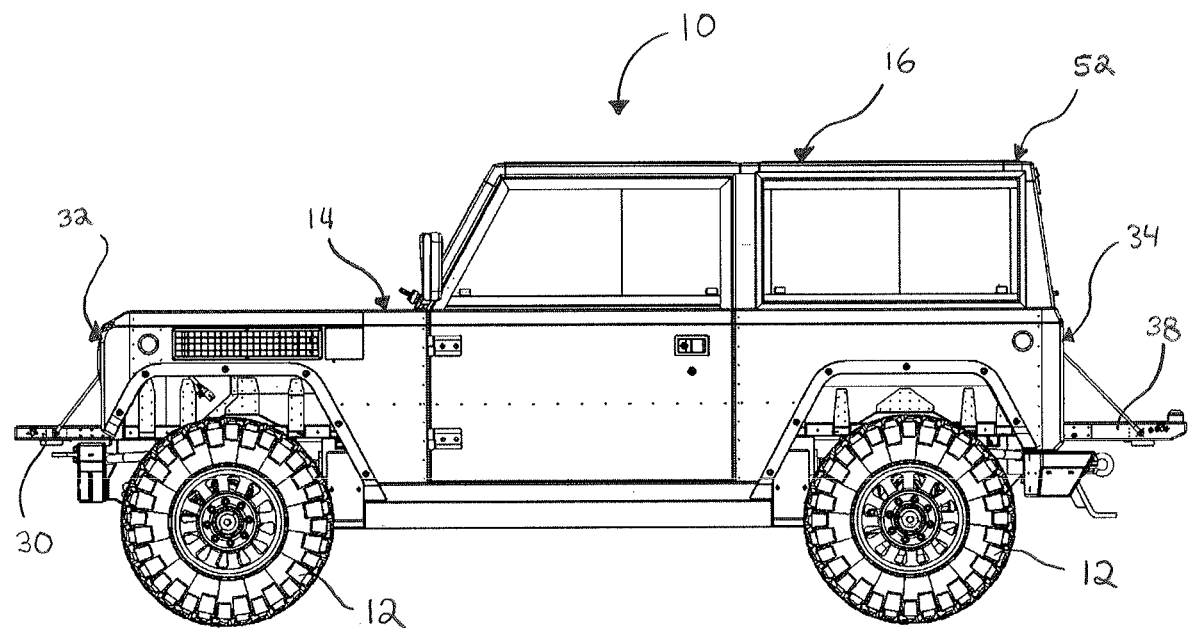
FIG. 1 illustrates a side view of an automotive vehicle with the tailgate and front gate both in open position.

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention.

As such, the following description is presented by way of illustration only and should not limit in any way the various alternatives and modifications that may be made to the illustrated embodiments and still be within the spirit and scope of the invention.

An automotive vehicle 10 is generally presented. The automotive vehicle 10 may include standard structural components of a typical automotive vehicle, including a plurality of wheels 12, a chassis, and a body 14. The body of the vehicle may generally include a cab 16. The design, structure, and configuration of the body 14 and cab 16 may provide numerous unique benefits, as described herein.

The vehicle 10 may be powered by a power source or powertrain 18 other than a standard combustion engine. Typical automotive vehicles include a gasoline powered internal combustion engine customarily positioned in the front portion of the vehicle, or in some cases in the rear of the vehicle. In contrast, the automotive vehicle 10 may be powered by a powertrain 18 that uses a fuel source other than gasoline, such an electric or battery powered engine. The alternative powertrain configuration may allow for rearranged layout of the powertrain components thus freeing spaces that are traditionally occupied by the powertrain, as set forth in the embodiments described below.

Figure 4:
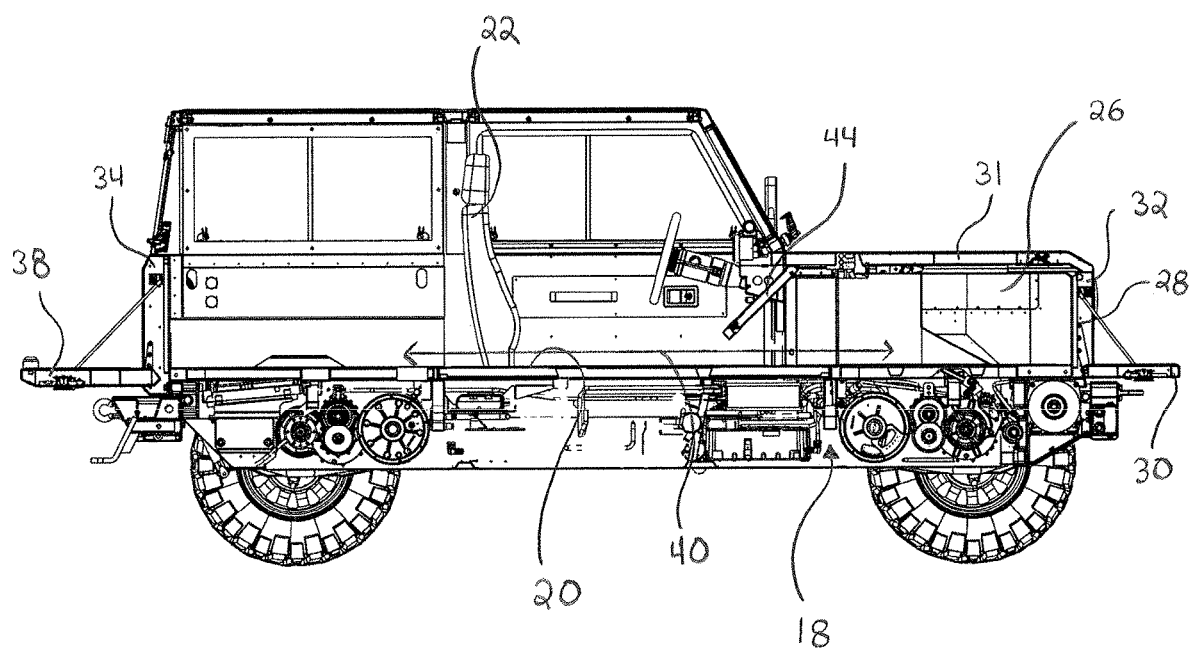
FIG. 4 illustrates a cutaway side view of an automotive vehicle.

The automotive vehicle may include floorboards 20 extending along the the base of the vehicle cab 16. The floorboards 20 may comprise metal plating or paneling, plastic matting, or other similar materials, or any combination thereof. The floorboards 20 may be positioned above the chassis and may generally form a plane. As best illustrated in FIG. 4, the powertrain 18 may be positioned primarily below the plane of the floorboards 20. It will be appreciated, however, that portions of batteries, power sources, or other drivetrain components may extend partially above the plane of the floorboards 20. Likewise, the seats 22, dashboard 24, and other components within the cab 16 may be generally positioned above the floorboards 20, although it will be appreciated that portions of some components, such as the base of the seats 22, may extend partially below the plane of the floorboards 20.

Figure 5:
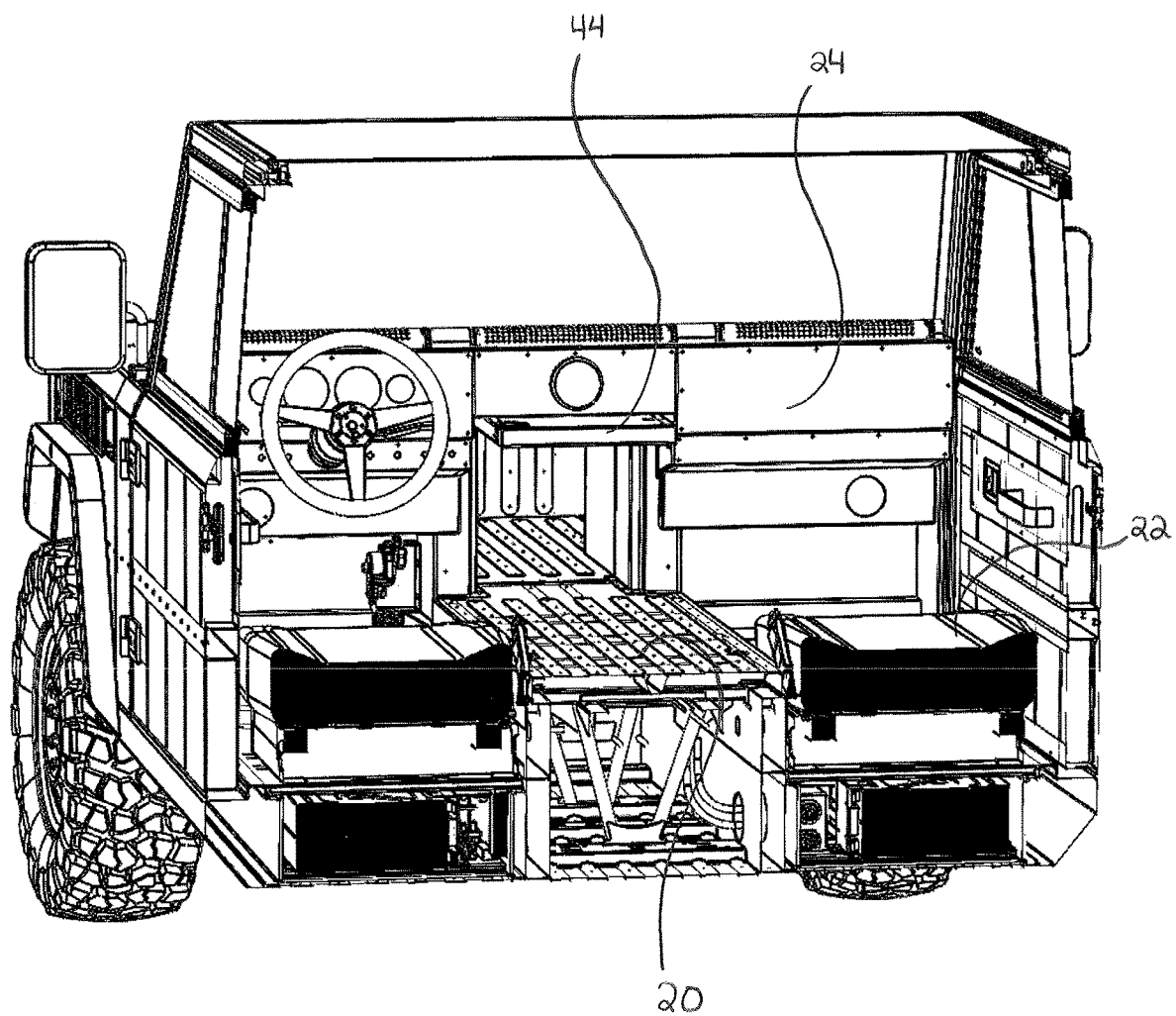
FIG. 5 illustrates a perspective view of the interior of an automotive vehicle having a pass through door in fully open position.

The arrangement of the powertrain 18 below the floorboards 20 creates open and usable spaces in the front and rear of the vehicle 10. Specifically, as best illustrated in FIGS. 2-7, the front portion of the vehicle 10 between the dashboard 24 and a front end 32 may be designated as a front trunk 26. The floorboards 20 may extend into the front trunk 26 as shown in FIGS. 4 and 5.

The vehicle 10 may include a front opening 28 in the body 14 to provide access to the front trunk 26 from the front end 32. The bottom of the front opening 28 may be generally level with the floorboards 20. The front opening 28 may be covered by a front gate 30. The front gate 30 may be hinged to the body or chassis of the vehicle 10 and may open downwards to provide access to the front opening 28. The front gate 30 may be operable between an open position and a closed position. In closed position, the front gate 30 may be positioned generally vertically and may be latched into place to prevent access to the front opening 28. In open position, as shown in FIGS. 1-4, the front gate 30 may pivot to a generally horizontal position. The open front gate 30 may be generally in line and level with the floorboards 20 in the front trunk 26 to extend the front trunk surface beyond the outer footprint of the vehicle 10.

The front trunk 26 may further include a hood 31. The hood 31 may be positioned above the front trunk 26 forming a lid or top cover thereto. The hood 31 may be hinged to the top body of the vehicle and capable of opening upwards to provide access to the top of the front trunk 26 space.

Figure 3:
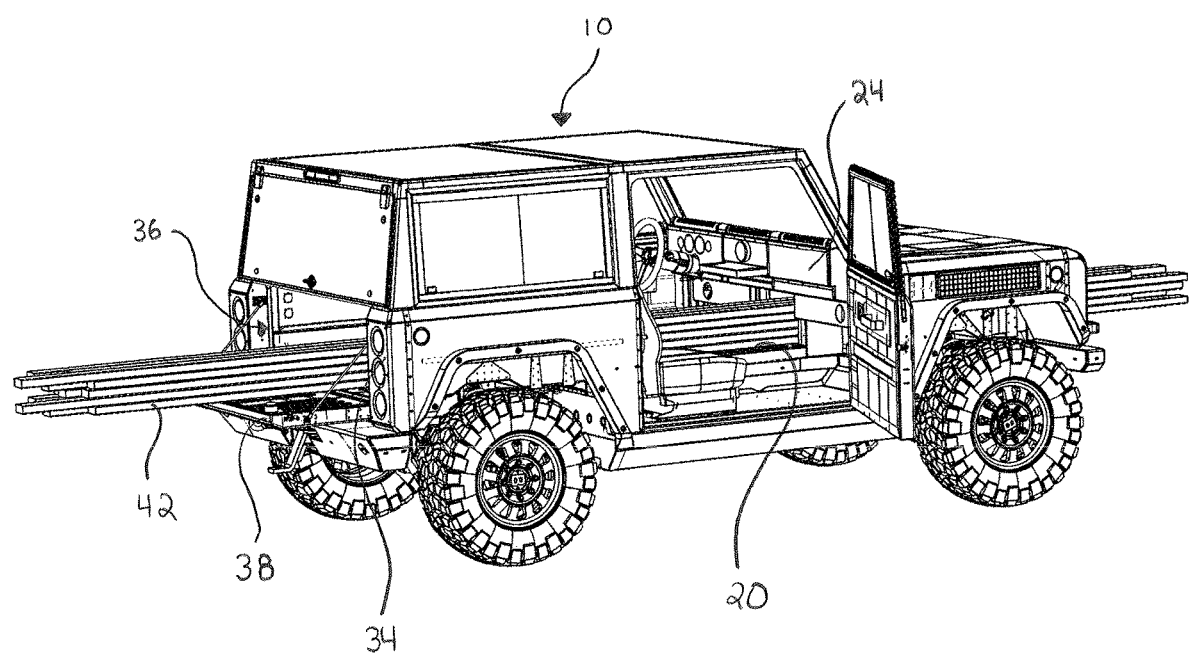
FIG. 3 illustrates a second side perspective view of an automotive vehicle with a door ajar having cargo extending through the tailgate and front gate and interior vehicle cabin.
Figure 7:
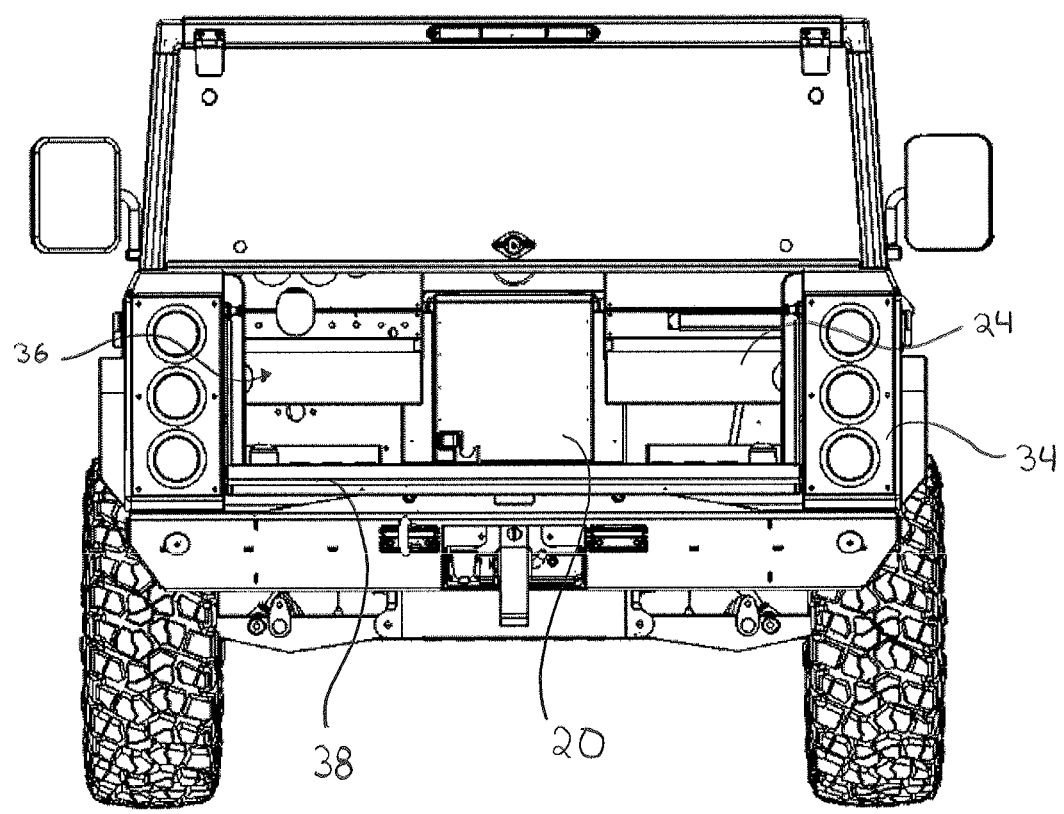
FIG. 7 illustrates a rear view of the interior of an automotive vehicle having a pass through door in closed position.

The floorboards 20 may extend from the front end 32 to the rear end 34 of the vehicle 10. As best illustrated in FIGS. 3 and 7, the rear end 34 of the vehicle 10 may comprise a rear opening 36. The bottom of the rear opening 36 may be generally level with the floorboards 20. A tailgate 38, may be connected to the body 14 at the rear opening 36. The tailgate 38 maybe hinged to the body 14 to be pivotable between an open position and a closed position. In closed position, the tailgate 38 may be latched and/or locked in generally vertical position to close and prevent access to the rear opening 36. In open position the tailgate 38 may pivot to a generally horizontal position and may be generally level with the floorboards 20 to extend the rear floorboards 20 beyond the outer footprint of the vehicle 10.

Figure 2:
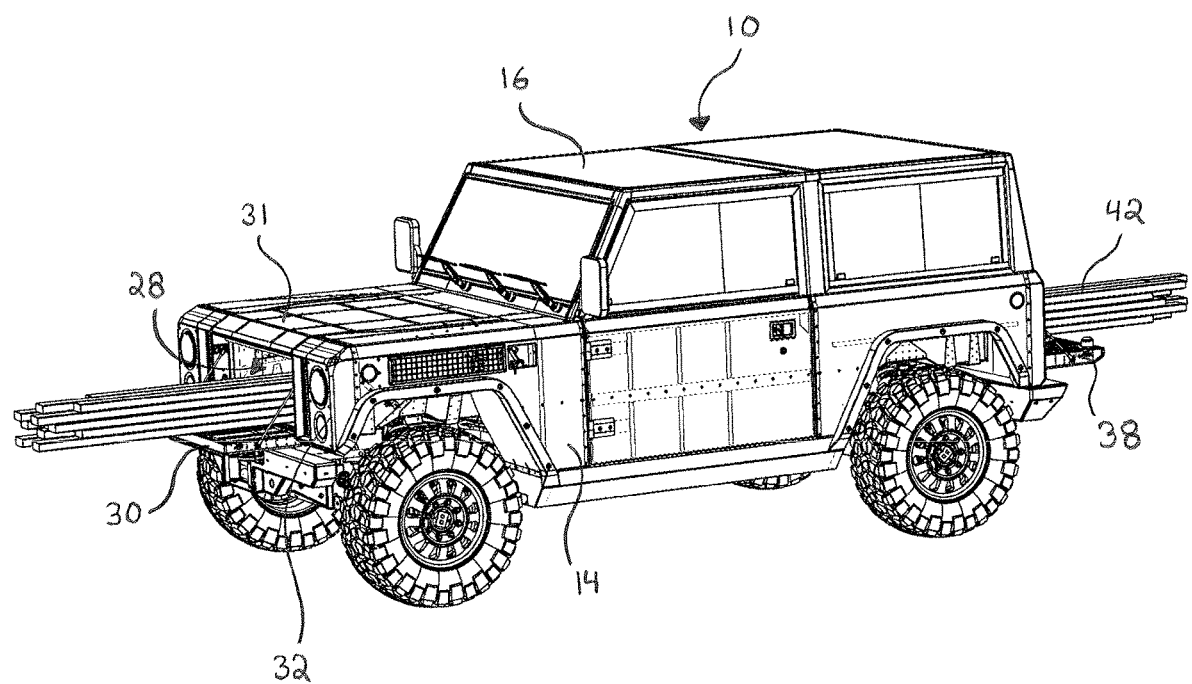
FIG. 2 illustrates a first side perspective view of an automotive vehicle having cargo extending through the tailgate and front gate and interior vehicle cabin.

In an embodiment, the vehicle 10 may include an uninterrupted path 40 between the rear opening 36 and the front opening 28. As shown in FIGS. 2 and 3, the uninterrupted path 40 may allow for cargo 42 that is greater in length than the vehicle 10 to be stored and transported within the vehicle 10. The cargo 42 may be inserted through the front opening 28 or rear opening 36 and may extend through one or both openings 28, 36 during transport. The supporting base of the floorboards 20 may be extended beyond the footprint of the vehicle body 14 by opening the front gate 30 and/or tailgate 38.

Figure 6:
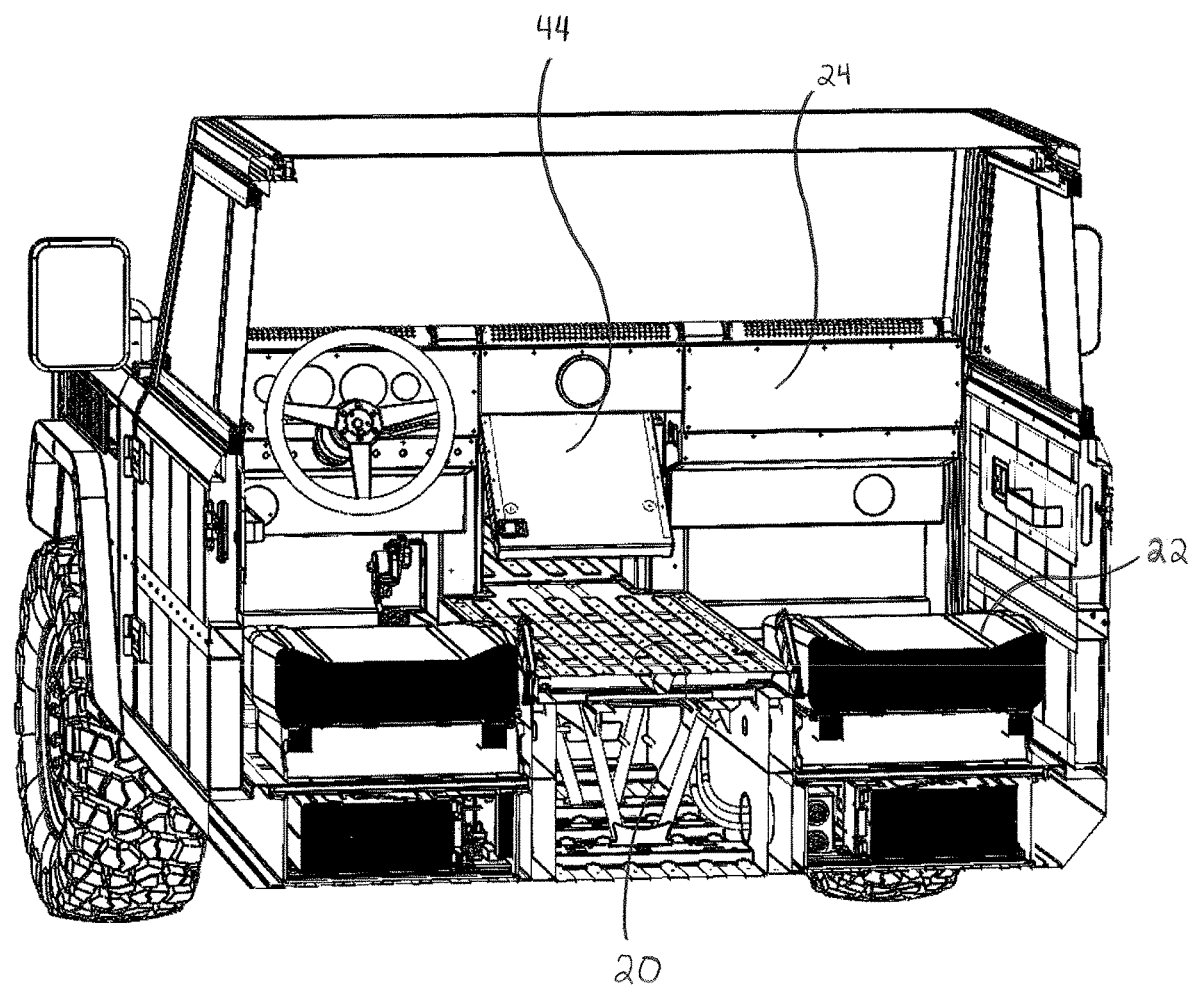
FIG. 6 illustrates a perspective view of the interior of an automotive vehicle having a pass through door in partially open position.

In an embodiment, the vehicle 10 may include a pass through door 44, as shown in FIGS. 5-7. The pass through door 44 may be located within the cab 16 and may be positioned in or near the dashboard 24, within the uninterrupted path 40. For example, the vehicle 10 may include a dashboard 24 that is positioned to partition the cab 16 from the front trunk space between the dash and the front end 32. The pass through door 44 may be positioned within the dash and selectively opened and closed to provide access between the cab 16 and the front trunk 26. The pass through door 44 may further provide selective access or restriction to the uninterrupted path 40 between the front opening 28 and the rear opening 36. For example, the door 44 may hinged to swing upward to an open position, as shown in FIG. 6. The door 44 may further be insertable into the dashboard to be stored in an open position, as shown in FIG. 5. It will be appreciated though, that the pass through door 44 may be moveable in any appropriate manner to open and close and provide selective access to the front trunk 26.

In an embodiment illustrated in FIGS. 1 and 8-11, the automotive vehicle may include a body 14 and cab 16 that is reconfigurable between two or more arrangements. In a first arrangement, shown in FIG. 1, the cab 16 may be configured to provide space for two rows of seating. In a second arrangement, shown in FIG. 11, the cab 16 may be configured to provide space for only one row of seating and create a truck bed 50 having no surrounding upper sidewalls or roof. While the reconfigurable cab 16 is shown and described herein as altering between one and two rows of seating, it will be appreciated that the embodiments disclosed herein may be applied to other seating arrangements, such as reconfiguring a vehicle between three rows of seating and two rows of seating.

Figure 8:
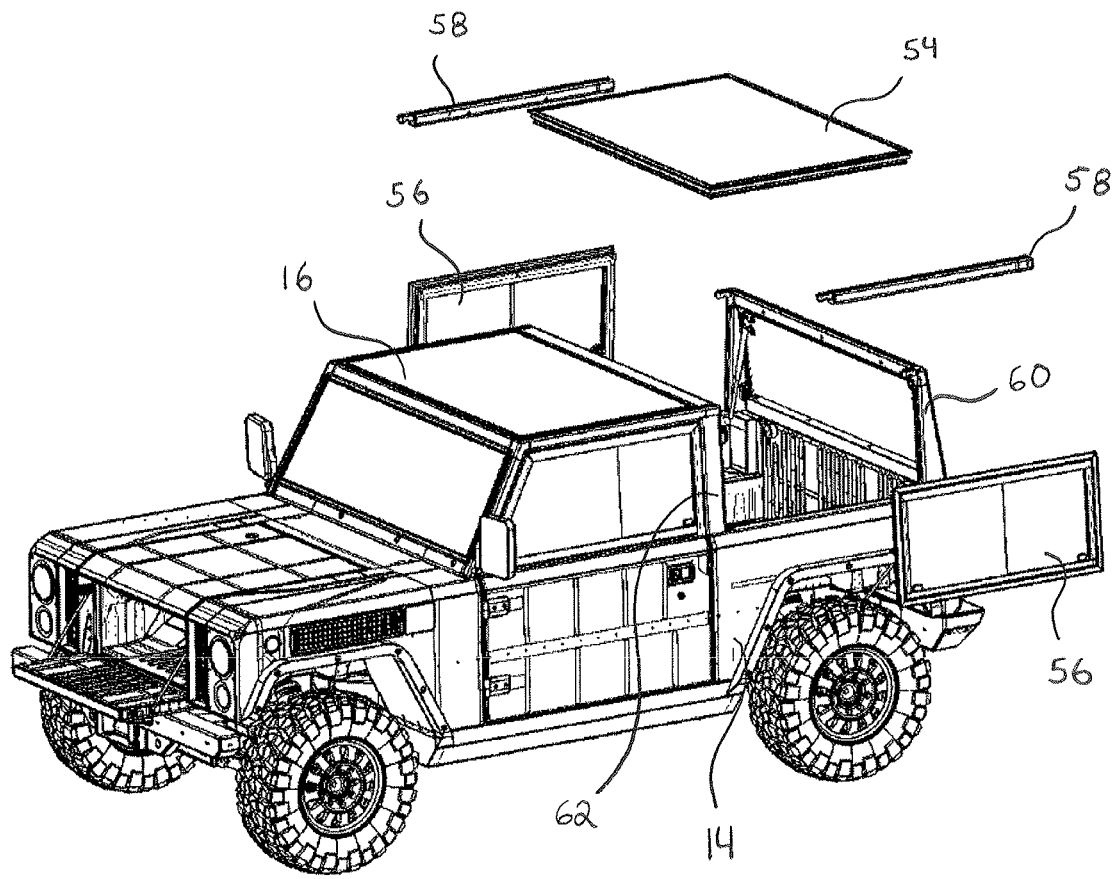
FIG. 8 illustrates a front perspective and exploded view of an automotive vehicle having a reconfigurable rear cab.
Figure 9:
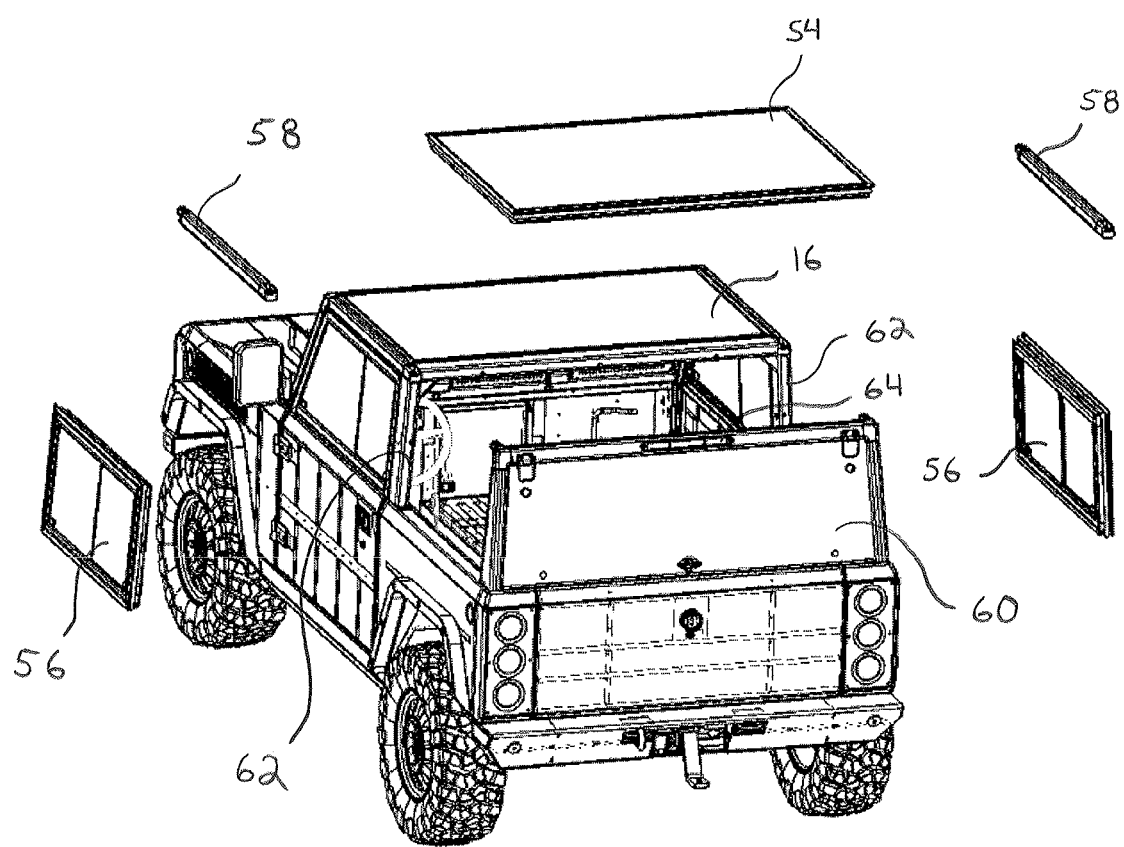
FIG. 9 illustrates a rear perspective and exploded view of an automotive vehicle having a reconfigurable rear cab.
Figure 10:
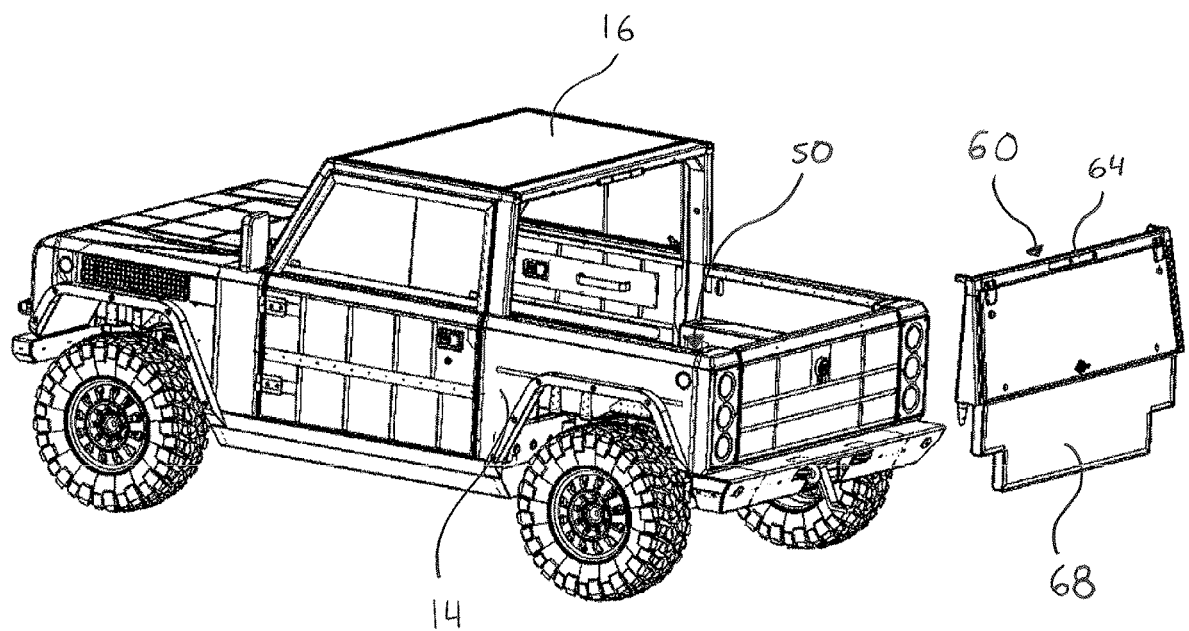
FIG. 10 illustrates a rear perspective view of an automotive vehicle having a rear cabin enclosure panel detached from the vehicle.

With reference to FIGS. 8-10, rear vehicle body may be formed of a plurality of structural components. The components may include one or more roof panels 54, a pair of side window panels 56, a pair of top beams 58, and a rear window panel 60. The components may be removably connected together to form the rear cab 52 and may be disconnected and reconfigured to provide an uncovered bed 50.

As shown in FIGS. 8 and 9, the rear window panel 60 may be removably connected to the rear end 34 of the vehicle 10 and may form the rearmost pillars of the vehicle 10. The side window panels 56 may be removably connected between the rear window panel 60 and the fixed middle pillars 62 of the vehicle 10. The top beams 58 may be removably connected between the top of the middle pillars 62 and the top of the rear window panel 60, above the respective side window panels 56. When assemble, the top beams 58, top of the rear window panel 60, and a portion of the body 14 may form a rectangular top frame. The one or more roof panels 54 may be removably connected to the top frame to form the roof of the cab 16.

It will be appreciated that the removable connections between the components of the rear cab 52 may be any appropriate connection, such as a screw or bolt connection, latch connection, or the like. In addition, the components and portions of the body 14 may be configured with additional features to assist in the fitted assembly of the components, such as retaining slots, clamps, hooks, pins, gaskets, and the like. Each removable connection between components may allow for manual connection of the components and manual disconnection of the components.

The rear window panel 60 may include an electrical connection to connect a rear brake or stop light 64 with the vehicle controller. The electrical connection may include a quick disconnect plug connectable to the rear window panel 60. The electrical connection may be disconnected prior to disassembly of the rear cab 52.

Figure 11:
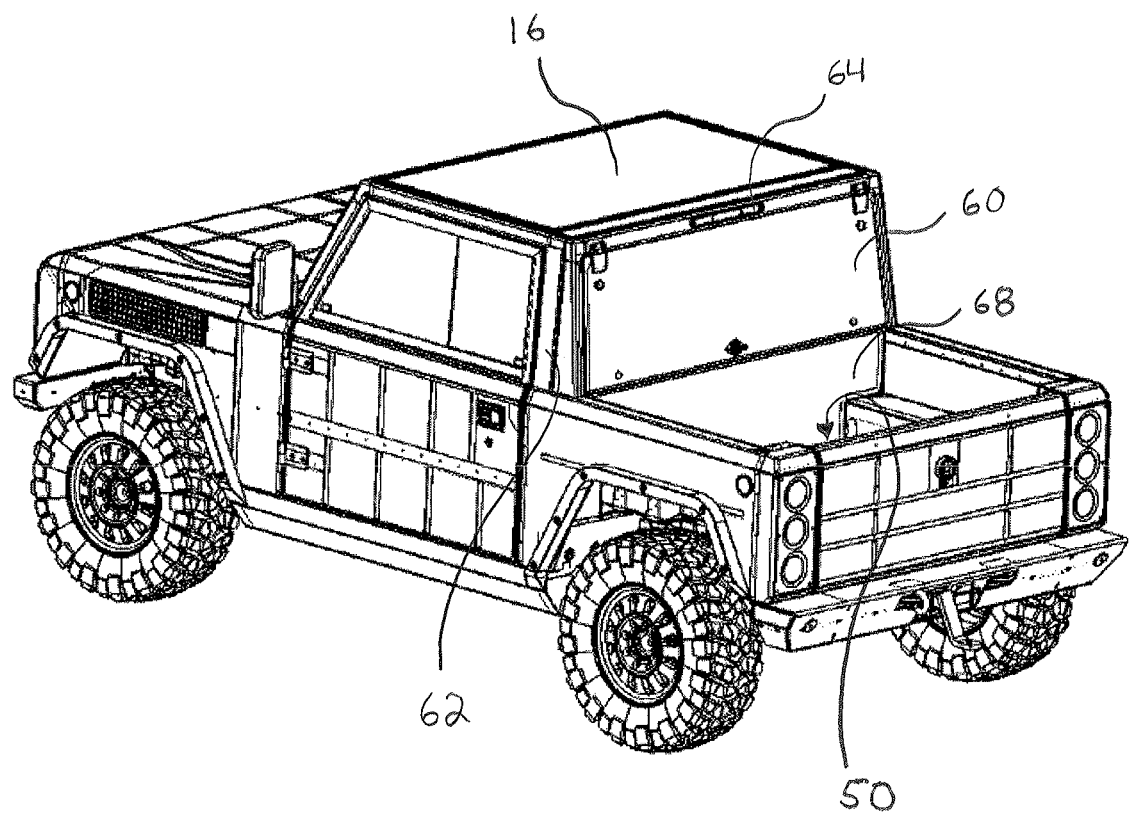
FIG. 11 illustrates a rear perspective view of an automotive vehicle having a rear cabin enclosure panel connected to the vehicle.

In the second arrangement, illustrated in FIGS. 10 and 11, the rear window panel 60 may be reconfigured to cover the entire cab opening at the middle pillar 62. Specifically, the rear window panel 60 may receive a lower portion 68 to be connected below the window and be sized and shaped similar to the lower rear opening in the cab 16 to completely close off the cab opening from the bed 50.

In use, the rear cab 52 may begin in assembled arrangement, as illustrated in FIG. 1. A method of reconfiguring the rear cab may comprise disconnecting and removing the roof panel 54 from the top beams 58. The side window panels 56 may be disconnected and removed from the body 14, top beams 58, middle pillar 62, and rear window panel 60. The top beams 58 may be disconnected from the rear window panel 60 and from the middle pillar 62. The brake light 64 of the rear window panel 60 may be electrically disconnected from the vehicle 10 and the rear window panel 60 may be disconnected from the rear end 34 of the vehicle 10. The lower panel 68 may be connected to the bottom of the rear window panel 60 and the full assembly may be moved to and installed at the middle of vehicle 10 alongside the middle pillar 62. The brake light 64 of the rear window panel 60 may then be electrically connected to the vehicle controller.

A method of reconfiguring the cab from the second arrangement back to the fully assembled cab 16 in the first arrangement may comprise disconnecting the rear brake light 64 and disconnecting the rear window panel 60 from the rear opening of the cab 16. The lower panel 68 may be removed and stored. The rear window panel 60, without the lower panel 68, may be connected to the rear end 34 of the vehicle 10 and the brake light 64 electrically connected. The top beams 58 may be installed and connected between the rear window panel 60 and middle pillars 62. The side window panels 56 may be connected to the rear window panel 60, middle pillars 62, and top beams 58. The roof panels 54 may be connected to the top beams 58 to form the roof of the cab 16.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, I claim:

1. An automotive vehicle comprising:
a plurality of wheels connected to a chassis;
a vehicle body connected to the chassis, the body including a front end and a rear end;
one or more floorboards positioned along the base of the vehicle body, the floorboards extending from the front end of the vehicle to the rear end of the vehicle;
a rear access opening in the rear body of the vehicle adjacent to the floorboards;
a front access opening in the front body of the vehicle adjacent to the floorboards;
wherein an uninterrupted path is formed through the vehicle along the floorboards between the rear access opening and the front access opening.

2. The automotive vehicle of claim 1 further comprising a front gate connected to the vehicle body at the front access opening, wherein the front gate is configured to provide selective access to the front access opening.

3. The automotive vehicle of claim 2, wherein the front gate is hinged to the vehicle body.

4. The automotive vehicle of claim 3, wherein the front gate is pivotable between an open position and a closed position.

5. The automotive vehicle of claim 3, wherein the front gate is generally level with the floorboards when in open position.

6. The automotive vehicle of claim 1 further comprising a tailgate connected to the vehicle body at the rear access opening, wherein the tailgate is configured to provide selective access to the rear access opening.

7. The automotive vehicle of claim 6, wherein the tailgate is pivotable between an open position and a closed position.

8. The automotive vehicle of claim 6, wherein the tailgate is generally level with the floorboards when in open position.

9. The automotive vehicle of claim 1 further comprising a pass through door located within the uninterrupted path, wherein the pass through door is configured to selectively close off access to the uninterrupted path.

10. The automotive vehicle of claim 9, wherein the pass through door is connected to a dashboard within the vehicle and configured to provide access to a space between the dashboard and the front end of the vehicle.

11. The automotive vehicle of claim 1, wherein the floorboards extend linearly between the front opening and the rear opening.

12. The automotive vehicle of claim 1, wherein the floorboards extend linearly between the front opening and the rear opening.

13. An automotive vehicle comprising:
a plurality of wheels connected to a chassis;

a vehicle body connected to the chassis, the body including a front end and a rear end and forming a cab having an interior;

a dashboard positioned within the cab interior;

one or more floorboards positioned along the base of the vehicle body, the floorboards extending from the front end of the vehicle through the interior of the cab;

a pass through door located within the dashboard and configured to move between an open position and a closed position; and wherein an uninterrupted path is formed along the floorboards between the interior of the cab and the front end, wherein the pass through door is positioned within the uninterrupted path.

14. The automotive vehicle of claim 13, wherein the dashboard is configured to partition the cab from a space between the dashboard and the front end of the vehicle.

15. The automotive vehicle of claim 13, wherein the pass through door is configured to pivot between an open position and a closed position.

16. The automotive vehicle of claim 13, wherein the pass through door is storable within the dashboard in an open position.

17. The automotive vehicle of claim 13, wherein the front end of the vehicle includes a front opening positioned at the floorboards.

18. An automotive vehicle comprising:

a plurality of wheels connected to a chassis;

a vehicle body connected to the chassis, the vehicle body including a front end, a rear end, and a cabin positioned between the front end and the rear end;

one or more floorboards positioned along the base of the vehicle body within the cabin;

a front trunk positioned between the cabin and the front end, the front trunk comprising an at least partially enclosed volume having a floor;

a front gate positioned at the front end of the vehicle and pivotable between an upright position and a horizontal position, wherein the front trunk is accessible through an opening when the front gate is pivoted away from upright position.

19. The automotive vehicle of claim 18 further comprising a hood, wherein the hood is pivotable between an open and closed position and wherein the hood is configured to provide access to the front trunk when in open position.

20. The automotive vehicle of claim 18, wherein the front gate includes an interior surface and wherein the interior surface is aligned with the floor of the front trunk when the front gate is in horizontal position.

* * * * *